Patented June 15, 1948

2,443,273

UNITED STATES PATENT OFFICE 2,443,273

BREAKING WATER-IN-OIL EMULSIONS

Richard A. Salathiel, Houston, Tex., assignor to Standard Oil Development Company, a corporation of Delaware No Drawing. Application December 18, 1944, Serial No. 568,775

9 Claims. (Cl. 252—333)

The present invention is directed to the preparation and use in the demulsification of water-in-oil emulsions of certain amine sulfonates of petroleum origin and to a method for testing petroleum sulfonates to ascertain whether or not they are adapted for use in the preparation of the demulsifying agents of the present invention.

Some organic amine base derivatives of certain petroleum mahogany sulfonate materials have been found to be highly effective demulsifying materials for some crude petroleum emulsions of the water-in-oil type. The amine sulfonates which are embodied in this invention are limited. Only certain petroleum mahogany sulfonate materials and a limited class of amine materials may be taken to produce amine sulfonate derivatives which exhibit the desired demulsifying properties.

Certain amine sulfonate derivatives from certain petroleum mahogany sulfonates were found to be more generally effective demulsifying materials than the amine petroleum sulfonate derivatives of the sludge layer or green petroleum sulfonic acids. Many of the petroleum mahogany sulfonate materials will yield derivatives of cyclohexyl amine or similar amines which are found not to be satisfactory, and which are, in fact, less effective demulsifying materials than the less expensive sodium or ammonium sulfonate derivatives of these sulfonate materials.

The usual petroleum mahogany sulfonates on the market are produced during the manufacture of white oils and medicinal white oils. The sodium sulfonate derivative is the usual marketed form of such sulfonates. These sodium sulfonates are very readily soluble in oil, it being possible to dilute them, when nearly free of water, to any extent with highly refined lubricating oils and obtain stable solutions. These sodium sulfonates are less easily dispersed in water than in oil, their solutions in water in some cases tending to be viscous until extensively diluted. Sodium sulfonates of this kind are used extensively in the demulsification of crude oil emulsions. Cyclohexyl amine, which is representative of amines having desirable properties for the preparation of some amine petroleum mahogany sulfonate derivatives having highly desirable characteristics, may readily be used to prepare amine sulfonate derivatives from these sulfonates. But they do not have the unusual and desirable demulsifying properties. In fact, they proved in tests to be less useful than the sodium sulfonate derivative of the sulfonate material.

Mahogany sulfonic acids of a preferred kind for the preparation of the amine sulfonate derivatives may suitably be prepared by sulfonation of a solvent extract from a Coastal lubricating oil distillate having a Saybolt Universal viscosity at 100° F. of 75 seconds. In the preparation of these sulfonic acids the solvent extract oil may be sulfonated using about 10 successive 40 pound treatments with 98% sulfuric acid for each barrel of oil remaining. The sludges are removed between each acid treatment. The mahogany sulfonic acids remain dissolved in the oil layer (acid oil) and are recovered by any appropriate means, as by adding an amount of water equal to 20 to 75 percent of the sulfonic acid content of the oil which causes the sulfonic acids, some oil and the water to separate out as a lower layer leaving most of the oil in the upper layer.

The "75 stock" solvent extract oil, which may be sulfonated as described above for the preparation of desirable mahogany sulfonic acids, is obtained by solvent extraction of a "75 stock" Coastal lube distillate with phenol. The raffinate is used in lubricating oils and the extract remains as a by-product not fit for most lubrication applications. This solvent extract is reactive to sulfuric acid to a much greater extent than is the raffinate fraction from the solvent extraction separation. A high yield of sulfonation products can be obtained by reaction of the "75 stock" solvent extract with sufficient sulfuric acid. The molecular weight of a sample of this solvent extract oil, as determined by a cryoscopic method, was found to be about 272. The molecular weights of the mahogany sulfonic acids obtained as outlined above from this kind of oil, as determined by a chemical analytical means, run about 360 to 390.

A mahogany sodium sulfonate prepared from sulfonic acids derived as described above from the "75 stock" solvent extract oil is much less readily oil soluble than the usual mahogany sulfonates of the market which are produced in the manufacture of white oils and medicinal white oils. Such a sodium sulfonate may be diluted with some oils and with aromatic solvents to give clear solutions if nearly free of water, but when a highly refined lubricating oil of low solvency power is used to dilute it extensively the solution is not stable and an upper layer of oil separates from the lower layer of sulfonate and a portion of the oil. This sodium sulfonate is much more readily soluble or dispersible in water than the usual sodium sulfonate derived from the mahogany sulfonic acids obtained in the manufacture of medicinal white oils. Although the sodium sulfonate derivative of the "75 stock" solvent extract oil mahogany sulfonic acids obtained as described above is readily soluble or dispersible in water, the cyclohexyl amine sulfonate derivative is essentially insoluble in water and forms only an unstable dispersion when mixed with several volumes of water, and it is soluble in any mineral oil.

Other mahogany petroleum sodium sulfonate materials have been found which are capable of use for the preparation of cyclohexyl amine sulfonate derivatives having the highly desirable demulsifying properties, but little is known concerning their processing history or the nature of the petroleum oil raw materials used in their preparation.

The properties of petroleum mahogany sulfonates depend upon a variety of factors such as the nature and average molecular weight of the oil used in the sulfonation, the strength and quantity of the sulfuric acid or oleum used, the manner in which the acid is applied, the temperature of the sulfonation reaction, the manner in which the sulfonic acids are separated from the reaction mixture, etc. It has usually not been possible to know just what properties to expect of any given petroleum sulfonate material without giving a sample of the material empirical testing in the use for which it is to be taken.

In order for it to be desirable to make an amine sulfonate derivative for use in breaking crude oil emulsions from a given petroleum mahogany sulfonate material, the amine sulfonate must have properties which may get decidedly more advantageous in use than the sodium sulfonate derivative which is the usual marketed form of the sulfonate. This is true because the amines are considerably more expensive bases than caustic soda or sodium carbonate.

As already stated, most of the mahogany sulfonates which are sold on the market are not desirable for use in preparing valuable cyclohexyl amine sulfonate derivatives for use in breaking crude petroleum emulsions, but some mahogany sulfonate materials have been found to be very valuable for this purpose. Some petroleum mahogany sulfonate materials have been found which are very considerably more effective for the treatment of some crude petroleum emulsions in the form of the cyclohexyl amine or similar amine sulfonate derivatives than in the usual form as sodium or ammonium sulfonates. For some cases these amine petroleum mahogany sulfonates are more valuable for the resolution of crude petroleum emulsions than any other petroleum sulfonate materials yet tested in this laboratory.

As indicated in the above discussion, there is a difference in the solubility properties between petroleum mahogany sodium sulfonates which were found useful and those which were found not useful in preparing cyclohexyl amine sulfonate derivatives of desirable demulsifying properties. No really suitable means for the classification of the various petroleum sulfonates and other sulfonates according to their solubility properties was found to be available. Accordingly, a principal feature of the present invention is the provision of a method for studying the solubility properties of petroleum sodium sulfonates. The results obtained by this method of testing will show clearly whether a petroleum sulfonate material may or may not be used for preparing desirable cyclohexyl amine or similar amine petroleum mahogany sulfonate derivatives.

The testing method of the present invention is specifically claimed in copending divisional application Serial No. 793,050, filed December 20, 1947, and is based upon the observations that as the sodium sulfonate material is more readily soluble in water more salt must be added to its aqueous solution to salt it out of solution, and as the sodium sulfonate is less oil soluble more salt must be added to the water present to remove the water from the sulfonate and allow the sulfonate to go into an oil solution. It is desirable to use some solvent in the test to prevent the formation of stable emulsions which would interfere with the test. Anhydrous isopropyl alcohol may be used for this purpose.

In conducting the test a hydrocarbon dilution solvent is employed. It is desirable that the hydrocarbon selected be in a substantially pure state and have a low solvent power for the sulfonates relative to the solvent power of water. The results obtained will vary with the solvent power of the hydrocarbon. Two hydrocarbons which may be conveniently used are benzene and normal heptane. The ultimate values which are determinative of the suitability of the sulfonate for the purpose intended are higher when heptane is employed than when benzene is employed and with other solvents having a solvency intermediate between these two the values will also be intermediate. Because the highest values are obtained with heptane and because this hydrocarbon is readily available in pure form, it is the preferred solvent for this test. For the purpose of further description of the test, it will be referred to as the heptane salt number test and the sulfonates will be referred to as having a heptane-salt number.

The heptane salt number test which may be used to determine the solubility properties of petroleum mahogany sodium sulfonates is made in the following way. The sample of sulfonate to be tested must be in the form of sodium sulfonate, free of inorganic salts, it must be dissolved in an oily non-aromatic type solvent, such as petroleum lube oil and it must contain 40 percent plus or minus 2 percent of sodium sulfonate. Into a 15 ml. test tube fitted with a stopper 4.00 ml. of normal heptane and 1.00 ml. of anhydrous isopropyl alcohol are measured carefully and then 1.0 ml. of the 40 percent sodium sulfonate solution is added and shaken until dissolved. Then 4.00 ml. of aqueous sodium chloride solution are added, the test tube shaken thoroughly, then centrifuged and observed to see the number of phases and the location of the sodium sulfonate in the system. This procedure is repeated using different strengths of aqueous sodium chloride solution until the limiting concentrations of sodium chloride solution which control the phase changes are found. For making small adjustments of the concentration of sodium chloride in the water in the system it is ordinarily convenient to add small amounts of strong sodium chloride solution or water with a small graduated serological pipette with a drawn out fine point. Care must be taken, however, that the volume of the aqueous solution at the limiting concentrations differs but little from 4.00 ml. An appreciable variation in the volume of the aqueous salt solution causes some variation in the values for the limiting salt concentrations found. The number of layers which separate and the location of the layer which contains the sodium sulfonate will be functions of the nature of the sulfonate and the concentration of the sodium chloride solution taken in the test. This give a means of classifying the various petroleum sulfonates according to their solubility properties.

The values obtained by this method of testing are called the "first heptane salt number" and the "second heptane salt number" for the sodium sulfonate sample tested. The "first heptane salt number" is the lowest concentration of sodium chloride, expressed as percent of sodium chloride in the aqueous salt solution, which causes a separate lower aqueous phase to separate. The "second heptane salt number" is the lowest concentration of sodium chloride which causes the separate heptane layer to vanish or to be dissolved into the sulfonate containing layer. The first heptane salt number may be smaller than or equal to or greater than the second heptane salt number.

In the case that the first heptane salt number is smaller than the second heptane salt number the following phase changes are observed as higher concentrations of sodium chloride solution are used in the test. Below the first limiting concentration of sodium chloride in the aqueous solution used in the test the sulfonate is found in the lower of two layers with a layer of heptane solution above. Above the first limiting concentration but below the second limiting concentration of sodium chloride in the aqueous solution the sulfonate will separate out in a third layer above a lower layer of aqueous salt solution and below a layer of heptane solution. Above the second limiting concentration of sodium chloride in the aqueous solution the sulfonate in the middle layer and then to a two layers above a lower layer of aqueous salts solution. In this case the system is changed from a two phase system with the sulfonate in the lower layer to a three phase system with the sulfonate in the middle layer and then to a two phase system with the sulfonate in the upper layer as more sodium chloride is present in the system.

In the case that the first heptane salt number is equal to the second heptane salt number the following phase changes are observed as higher concentrations of sodium chloride solution are used in the test. Below the limiting concentration of sodium chloride in the aqueous solution the sulfonate is found in the lower of two layers with a layer of heptane solution above. Above the limiting concentration of sodium chloride in the aqueous solution the sulfonate will be found in the upper of two layers with a layer of aqueous salt solution below. In this case the system changes from a two phase system with the sulfonate in the lower layer to a two phase system with the sulfonate in the upper layer as more sodium chloride is present in the system.

In the case that the first heptane salt number is larger than the second heptane salt number the following phase changes are observed as higher concentrations of sodium chloride solution are used in the test. Below the first limiting concentration of sodium chloride in the aqueous solution (second heptane salt number) the sodium sulfonate will be found in the lower of two layers with a layer of heptane solution above. Above the first limiting concentration of sodium chloride (second heptane salt number) but below the second limiting concentration (first heptane salt number) the contents of the whole tube will be a homogeneous and clear solution with salt water, sulfonate and heptane all dissolved together. Above the second limiting concentration of sodium chloride in the aqueous solution (first heptane salt number) the sodium sulfonate will be found in the upper of two layers with a layer of aqueous salt solution below. In this case the system changes from a two phase system with the sulfonate in the lower layer to a single phase system and then back to a two phase system but with the sulfonate in the upper layer as more sodium chloride is present in the system.

The "more water soluble" and "less oil soluble" sodium sulfonate materials have first heptane salt numbers lower than the second heptane salt numbers. Some sodium sulfonates which are readily oil soluble and much less readily water soluble have first heptane salt numbers which are larger than the second heptane salt numbers. The case where the first and second heptane salt numbers are equal is the limiting case between the two extremes.

In order to get good repeatable results with the heptane salt number test it is necessary to measure the volumes of materials carefully, to shake the test tube very thoroughly before allowing the phases to separate and to keep the temperature near to 77° F. which is taken as standard for the test. Only a small difference in the amount of anhydrous isopropyl alcohol taken makes an appreciable difference in the results obtained.

In the foregoing description of the test, the various additions of salt have been made to the same initial mixture. For example, it has been pointed out that a salt solution of a sufficient concentration must be employed so that the desired concentration in the salt water layer can be attained without any significant increase in volume. It will be apparent that instead of making repeated additions of concentrated salt solution to the same test mixture, a plurality of test mixtures can be made up, each with a salt solution of different concentration. In this case, care must be taken to make the different samples comparable, both as to quantities of materials and as to conditions of operation.

It is to be borne in mind also that while the proportions of materials given for the test are critical for the standards established by those proportions, different proportions may be employed to produce different standards. For example, when using one ml. of isopropyl alcohol this amount cannot be varied for the purpose of evaluating a plurality of sulfonates. If, however, 1½ ml. of isopropyl alcohol is consistently used, comparable results will also be obtained although the salt numbers for the various sulfonates will be different from those obtained when 1 ml. of isopropyl alcohol is used. Likewise, if a different quantity of the hydrocarbon solvent is employed the salt numbers will vary. Therefore, for the purpose of evaluating sulfonates, it is expedient to adhere closely to the proportions used in the various tests so that all of the sulfonates will be referred to the same standard. While sodium chloride has been designated as the salt employed in the test heretofore described, it will be apparent that other inorganic salts may be used so long as they do not form insoluble precipitates with the sulfonates. The most convenient salts are the alkali metal salts and of these sodium chloride is preferred as it is a more effective salting out agent than other common alkali metal salts.

Ordinarily, the sulfonate sample as received is not in such condition that it may be tested to find the heptane salt number. The concentration of sodium sulfonate may be either too high or too low. Frequently there are inorganic salts present which must be removed before testing. There may be aromatic or other strong solvents present which would disturb the results. Also the sulfonate material may be in another form than that of the sodium sulfonate derivative so that it must be changed to sodium sulfonate before testing, because other sulfonate derivatives such as calcium, iron, magnesium, aluminum and most amine sulfonate derivatives have very different solubility properties.

If the sulfonate material is obtained in the form of the sulfonic acid it may be neutralized with sodium hydroxide to obtain sodium sulfonate. If the sample contains ammonium sulfonate just sufficient sodium hydroxide to liberate the ammonia may be added, the sample diluted with a suitable solvent and boiled to remove the free ammonia. If the petroleum mahogany sulfonate is obtained in the form of an unknown derivative, or as a calcium, magnesium, iron, aluminum or amine sulfonate it will be necessary to remove all metal ions or amine ions from the sample so that the sodium sulfonate may be prepared. In order to do this the sulfonate sample may be dissolved in ethyl ether and washed a number of times with dilute hydrochloric acid until metal salts or amine salts have been removed leaving the sulfonate material in the form of sulfonic acids dissolved in the ether. Sodium sulfonate may then be obtained by neutralizing the sulfonic acids with sodium hydroxide.

Essentially all of the inorganic salts may be removed from crude or semi-purified mahogany sodium sulfonates by dissolving the sample in about seven volumes of a solvent made up of two parts of xylene and one part of isopropyl alcohol, washing this solution with a large volume of saturated sodium chloride solution, distilling the clear sulfonate solution layer to remove the last of the water from the solution and filtering out any separated salts.

Any undesirable hydrocarbon solvents or any excess oil may be removed from the sulfonate sample by using the analytical method for separating sulfonate from oil wherein the sample is dissolved in a solution of aqueous isopropyl alcohol and the oil extracted out with petroleum ether. The desired amount of a suitable oil may then be added to the sample so that the final solution after removal of the volatile solvent will contain 40 percent of sodium sulfonate in oil.

It was found that in all cases where the mahogany sodium sulfonate is capable of being made into a desirable cyclohexyl amine sulfonate derivative having valuable demulsifying properties the first heptane salt number is smaller than the second heptane salt number. Petroleum mahogany sodium sulfonates which are suitable for making the cyclohexyl amine or similar amine sulfonate derivatives with desirable demusifying properties have first heptane salt numbers of more than 2.0 and second heptane salt numbers of less than 23. The first heptane salt numbers for these petroleum mahogany sodium sulfonate materials will have values within the limits of 2.0 and 8.0 and the second heptane salt numbers will have values within the limits of 5.0 and 23. Just outside this range in the directions of greater or lesser "water solubility" desirable amine sulfonate derivatives may be obtained. But it is with sulfonate materials having values within the above limits that the most desirable amine sulfonate derivatives are obtained. Several examples may be given. One petroleum mahogany sodium sulfonate material which was found to be highly suitable for preparing a desirable cyclohexyl amine sulfonate derivative had a first heptane salt number of 2.6 and a second heptane salt number of 10.0. Another petroleum mahogany sodium sulfonate material (derived from sulfonic acids prepared as described on page 2), which was found valuable for making desirable cyclohexyl amine and similar amine sulfonate derivatives for use as demulsifiers, had a first heptane sale number of 5.4 and a second heptane salt number of 14.8. A petroleum mahogany sodium sulfonate material, which has been widely used in the treatment of crude petroleum emulsions largely in blends with other demulsifying materials, was found to yield a cyclohexylamine sulfonate derivative not having desirable demulsifying properties. The first heptane salt number for this sodium sulfonate material was found to be 0.53 and the second heptane salt number was found to be 0.49. Another petroleum mahogany sodium sulfonate material, which was found to yield a cyclohexyl amine sulfonate derivative not having desirable demulsifying properties, has a first heptane salt number of 0.77 and a second heptane salt number of 0.92.

By far the largest part of the petroleum mahogany sodium sulfonates sold on the market have both first and second heptane salt numbers below 1.5. Materials of this kind yield cyclohexyl amine sulfonate derivatives which do not have desirable demulsifying properties.

Comparative demulsification tests on amine sulfonate derivatives from a suitable mahogany petroleum sodium sulfonate material using a representative Gulf Coast crude oil emulsion showed that the cyclohexyl amine sulfonate derivative is highly effective as a demulsifier, much more effective than the corresponding sodium sulfonate. The triamyl amine sulfonate derivative is considerably more effective than the sodium sulfonate but less effective than the cyclohexyl amine sulfonate; and the aniline sulfonate derivative is no more effective than the sodium sulfonate.

In general it appears practically and economically desirable to use cyclohexyl amine as the organic amine base for the preparation of these amine sulfonate derivatives. However, other primary, secondary and tertiary alkyl, aryl and aralkyl amines which contain only one nitrogen atom and no other combined atoms other than carbon and hydrogen in the molecule, and which have molecular weights within the limits of 55 and 200, and which have dissociation constants within the limits of from $1 \times 10^{-6}$ to $5 \times 10^{-3}$ may be used in place of cyclohexyl amine in the preparation of highly effective amine sulfonate demulsifiers from suitable petroleum mahogany sulfonate materials. Aniline and similar aromatic amines are not suitable for preparing the desirable amine sulfonate derivatives because their dissociation constants are too low. A low dissociation constant in the amine component of an amine sulfonate favors decomposition of the amine sulfonate into sulfonic acids and the amine in the presence of water so that the amine sulfonate is not able to act, as such, on the emulsion for a very long period of time. Not only is such an amine sulfonate as aniline sulfonate decomposed in water solution so that it is not available as such for a long period of time in the system as a demulsifying material, but its decomposition leaves the solution acidic. Even if a considerable excess of the very weak base is used, hydrolysis of the amine sulfonate will leave the solution acidic and therefore corrosive to at least a troublesome extent for some applications.

The Handbook of Chemistry and Physics, 25th edition (1941-2), Chemical Rubber Publishing Company, page 1341, shows dissociation constants for a number of bases including organic amines. The dissociation constant shown is that for the dissociation of hydroxyl ion in an aqueous solution of the base. Aniline, which is an organic amine base much weaker than desired for use in the preparation of suitable amine sulfonates, has a dissociation constant of $4.6 \times 10^{-10}$. Piperidine, which is one of the strongest organic amine bases, has a dissociation constant of $1.6 \times 10^{-3}$. The paper by Carswell and Morrill in Industrial and Engineering Chemistry, volume 29, pages 1247 to 1251 inclusive, November 1937, stated that cyclohexyl amine is a strong organic amine base being surpassed in that respect only by piperidine.

Among the organic amines which may be used in place of cyclohexyl amine for the preparation of desirable amine sulfonate derivatives from suitable petroleum mahogany sulfonate materials may be listed the following chemicals, groups of chemicals and preparations: tri-methyl amine, ethyl methyl amine, di-ethyl amine, tri-ethyl amine, methyl di-ethyl amine, propyl amines, di-propyl amines, tri-propyl amines, butyl amines, di-butyl amines, tri-butyl amines, ethyl butyl amine, amyl amines, di-amyl amines, mono-amines derived from the pentane to dodecane fractions of aliphatic and naphthenic portions of petroleum, benzyl amine, di-ethyl benzyl amine, etc.

In order to prepare cyclohexyl amine petroleum mahogany sulfonates any one of several methods may be used. The following suitable methods will be mentioned. The mahogany sulfonic acids may be neutralized with cyclohexyl amine to produce the amine sulfonate. An ammonium sulfonate solution may be mixed with the required amount of cyclohexyl amine and boiled to cause the more volatile ammonia to be driven off in gaseous form. An aqueous solution of sodium mahogany sulfonate may be mixed with the calculated amount of cyclohexyl amine hydrochloride solution and sufficient hydrocarbon solvent added to dissolve the cyclohexyl amine sulfonate which forms. Upon standing the cyclohexyl amine sulfonate solution in hydrocarbon solvent will separate out as an upper layer above the lower layer of aqueous salts solution. With suitable concentrations this separation of phases takes place readily, but with some sulfonate materials and with some concentrations of many sulfonate materials the addition of some alcohol type solvent may be required to assist in the separation of the phases.

In all cases the desired amine sulfonate derivatives of suitable mahogany petroleum sulfonate materials are less readily soluble or dispersible in water and more readily soluble in hydrocarbon oils than the corresponding sodium sulfonate derivatives.

Starting with a petroleum mahogany sodium sulfonate material which had a first heptane salt number of 5.4 and a second heptane salt number of 14.8 three amine sulfonate derivatives were prepared and tested as demulsifiers along with the sodium sulfonate on a stable crude oil emulsion from the Humble Oil and Refining Company, W. L. Garth B. Lease in the Anahuac, Texas, field. This emulson contained 15 percent of emulsified brine. Tests were made at 120° F. and the duration of the test was one hour. In the tests 1 part of sulfonate was added for each 10,000 parts of emulsion. In the blank test, to which no sulfonate was added, the emulsion was not visibly changed during the hour at 120° F. Sodium sulfonate caused a partial break down of the emulsion but left about 3 percent of brine emulsified in the oil and only a small part of the brine was liberated below, most of it remaining bound in a rather stable "sludge" emulsion just above the separated brine. The aniline sulfonate derivative, which was prepared, was found to behave essentially like the sodium sulfonate as a demulsifier for this emulsion. The tri-amyl amine sulfonate derivative, which was prepared, was more effective than the sodium or aniline sulfonate derivatives. It caused the brine content of the upper layer of oil to be reduced to about 1.5 percent and most of the brine settled out as a clear lower layer, with only a very small amount bound in the form of a loose emulsion between the oil and brine layers. The cyclohexyl amine sulfonate derivative, which was prepared, was found to be much more effective than the other derivatives. The brine content of the oil layer was reduced to about 0.15 percent and most of the brine separated out free as a lower layer with only a small amount of it bound as a loose "sludge" emulsion between the oil and brine layers.

Starting with a petroleum mahogany sodium sulfonate material which has a first heptane salt number of 0.53 and a second heptane salt number of 0.49 three amine sulfonate derivatives were made. They were the aniline sulfonate, cyclohexyl amine sulfonate and ortho-amino dicyclohexyl mahogany sulfonate. These materials when tested alone without admixture with other demulsifying materials were not sufficiently effective to cause a complete break down of any of the emulsions tested. However, the tests indicated that none of these amine sulfonate derivatives is more useful than the sodium sulfonate, in fact, the amine sulfonates appeared to be somewhat less desirable.

While it has been found that desirable results in demulsification of some crude oil emulsions may be obtained by the use of certain amine petroleum mahogany sulfonate materials, these amine sulfonate materials will much more frequently find use in the resolution of crude oil emulsions if they are used in conjunction with other demulsifying materials. One effective demulsifying composition is a mixture of the cyclohexyl amine sulfonate derivative of the sulfonic acids prepared as described on page 3 and a reaction product of a polyethylene glycol and a heat bodied vegetable oil together with solvents to make the blend homogeneous and suitably fluid. This composition has found very general use in the Gulf Coast oil fields. These amine sulfonates can be used to advantage with a wide variety of the resinoid or sub-resinous demulsifiers and other demulsifying materials. Among the demulsifying materials, besides the polyethylene glycol fatty oil reaction product demulsifiers, which can be used to advantage with these amine petroleum mahogany sulfonates are the modified polybasic acid polyhydric alcohol demulsifiers, various polyethylene oxide reaction products containing large hydrocarbon radicals, blown oil such as blown castor oil and blown corn oil, petroleum ammonium or sodium sulfonates, sulfonated vegetable and animal oils, alkylated naphthalene sulfonates and fatty acids or fatty acid soaps.

The nature and objects of the present invention having been thus described, what is claimed as new and useful and is desired to be secured by Letters Patent is:

1. A method for resolving a petroleum emulsion of the water-in-oil type into its components which comprises adding to it the salt of the reaction between a petroleum sulfonate having a first heptane salt number greater than 2 and a second heptane salt number less than 23, and an organic amine containing only carbon, hydrogen, and one atom of nitrogen per molecule and having a molecular weight between 55 and 200 and a dissociation constant between $1 \times 10^{-6}$ and $5 \times 10^{-3}$.

2. A method for resolving a petroleum emulsion of the water-in-oil type into its components which comprises adding to it the salt of the reaction between a petroleum sulfonate having a first heptane salt number between 2 and 8 and a second heptane salt number between 5 and 23, and an organic amine containing only carbon, hydrogen, and one atom of nitrogen per molecule and having a molecular weight between 55 and 200 and a dissociation constant between about $1 \times 10^{-6}$ and $5 \times 10^{-3}$.

3. A method according to claim 1 in which the petroleum sulfonate is a petroleum mahogany sulfonate.

4. A method according to claim 2 in which the petroleum sulfonate is a petroleum mahogany sulfonate.

5. A method according to claim 1 in which the amine is cyclohexyl amine.

6. A method according to claim 2 in which the amine is cyclohexyl amine.

7. A method according to claim 1 in which the petroleum sulfonate is a petroleum mahogany sulfonate and the amine is cyclohexyl amine.

8. A method according to claim 2 in which the petrolem sulfonate is a petroleum mahogany sulfonate and the amine is cyclohexyl amine.

9. A method according to claim 1 in which the sulfonate is one obtained by sulfonating a fraction obtained as an extract from coastal lube distillate by extraction thereof with a solvent having a selective solvent power for non-paraffinic hydrocarbons.

RICHARD A. SALATHIEL.

REFERENCES CITED

The following references are of record in the file of this patent:

UNITED STATES PATENTS

| Number | Name | Date |
|---|---|---|
| 1,495,314 | Walker | May 27, 1924 |
| 1,747,987 | Reddish | Feb. 18, 1930 |
| 2,089,035 | Oberlin | Aug. 3, 1937 |
| 2,153,753 | De Groote et al. | Feb. 11, 1939 |
| 2,231,752 | De Groote | Feb. 11, 1941 |
| 2,231,753 | De Groote | Feb. 11, 1941 |
| 2,303,265 | Francis | Nov. 24, 1942 |
| 2,365,853 | Arguss et al. | Dec. 26, 1944 |